United States Patent [19]
Lobb

[11] 4,390,253
[45] Jun. 28, 1983

[54] PITCH AND ROLL MOTION OPTICAL SYSTEM FOR WIDE ANGLE DISPLAY

[75] Inventor: Daniel R. Lobb, Chislehurst, England
[73] Assignee: Redifon Simulation Limited, Sussex, England
[21] Appl. No.: 283,141
[22] Filed: Jul. 14, 1981
[51] Int. Cl.³ .................. G02B 17/08; G02B 27/18; G03B 21/28; G09B 9/08
[52] U.S. Cl. .................. 350/505; 353/12; 353/99; 434/40; 434/44
[58] Field of Search .................. 350/505, 504, 294; 353/12, 13, 99; 434/38, 40, 44

[56] References Cited

U.S. PATENT DOCUMENTS

| | | | |
|---|---|---|---|
| 3,190,171 | 6/1965 | Reed | 350/505 |
| 3,432,219 | 3/1969 | Shenker et al. | 350/504 |
| 3,880,509 | 4/1975 | Herndou | 350/294 |
| 4,131,345 | 12/1978 | Carollo | 434/44 |

*Primary Examiner*—Jon W. Henry
*Attorney, Agent, or Firm*—Larson and Taylor

[57] ABSTRACT

A roll and pitch motion optical system, particularly for a ground-based flight simulator visual display using a raster-scanned laser optical projector and a concave part-spherical display screen and requiring a wide-angle display. The optical system uses an input concave paraboloidal mirror and an output convex paraboloidal mirror of complementary shape. The intermediate optics comprise a collimator to constrict the display beam envelope, roll and pitch prisms positioned in the constricted area and close to the output mirror and a concave spherical mirror to reflect beams from the pitch prism back onto the output paraboloidal mirror.

5 Claims, 5 Drawing Figures

PITCH AND ROLL MOTION OPTICAL SYSTEM FOR WIDE ANGLE DISPLAY

BACKGROUND OF THE INVENTION

This invention relates generally to optical apparatus for viewing a wide angle input field and providing a wide angle output field image at unit magnification and also providing rotation at the output field about one or more axes. The invention relates particularly to optical apparatus for viewing a wide-angle scene and for providing pitch and roll motions for a wide-angle visual display for ground-based craft flight simulators.

Conventionally, in ground-based flight simulators a visual display projector is mounted on the craft cockpit which itself is mounted on the platform of a motion system. The projector projects an image forwardly onto a display screen which is viewed by a trainee pilot from inside the craft cockpit. The function of the pitch and roll optical apparatus of the invention is to receive light from the display projector and to direct its output light onto the display screen while providing pitch and roll rotations of its own output with respect to its input from the display projector.

Conventionally also, pitch and roll optical systems comprise rotatable pitch and roll prisms, which are separately rotatable to provide the pitch and roll motions of the viewed display. Such known pitch and roll systems are effective and adequate for small field angle displays.

For specific purposes, wide angle displays are required. For example, a helicopter flight simulator might require a visual display the field angles of which might be 180° (±90°) in azimuth, together with 60° (+15°, −45°) in elevation/declination.

Such very large field angles present major problems in the design of a suitable pitch and roll optical system, firstly to provide the very large input and output field angles without introducing blurring, aberration or distortion, or even vignetting, of the image and secondly to provide a region within the system where the field angles and the beam diameter are both sufficiently small to permit inclusion of the rotatable pitch and roll prisms.

The general object of the invention is to provide improved optical apparatus of the type described above for viewing a wide-angle field and providing a wide-angle display.

The particular object of the invention is to provide such an optical system which is compatible with the above mentioned design requirements in providing a practical pitch and roll system for use with a wide-angle display projector wherein the output is a pencil beam, such as for example a scanned-laser projector.

Accordingly, the invention provides optical apparatus for receiving radiation from a wide-angle input field, and transmitting the radiation into a wide-angle output field, said transmission being such that the output field is an image of the input field formed substantially at unit magnification, and for providing rotation at the output field with respect to the input field, said optical apparatus comprising a concave axially-symmetric aspheric mirror and a convex axially-symmetric aspheric mirror having complementary reflecting surface shapes, approximately paraboloids, at the foci of which the entrance and exit pupils of the system are located, and an optical system in the radiation path between the two mirrors comprising reflecting prisms and two imaging systems of equal focal length and complementary distortion located such that their inner focal surfaces coincide at an intermediate pupil image and their outer focal surfaces are respectively near the two aspheric mirrors such that the surfaces of the two aspheric mirrors are imaged one onto the other at substantially unit magnification and without distortion, the optical axes of the two aspheric mirrors and of all elements of the two imaging systems being imaged onto a common line by reflection in the reflecting prisms, the reflecting prisms being rotatable to provide deflection of reflected radiation and of the optical axes of elements in the path of reflected radiation, so that radiation received from an input field at a first of the two aspheric mirrors is transmitted to the second of the two aspheric mirrors and reflected from it into an output field formed substantially at unit magnification and so that the output field is rotatable with respect to the input field.

BRIEF DESCRIPTION OF THE DRAWINGS

In order that the invention may readily be carried into practice, two embodiments will be described with reference to the accompanying drawings, of which.

The same or like elements are indicated by the same reference numerals throughout the several figures.

DESCRIPTION OF THE EMBODIMENT

Figure 1:
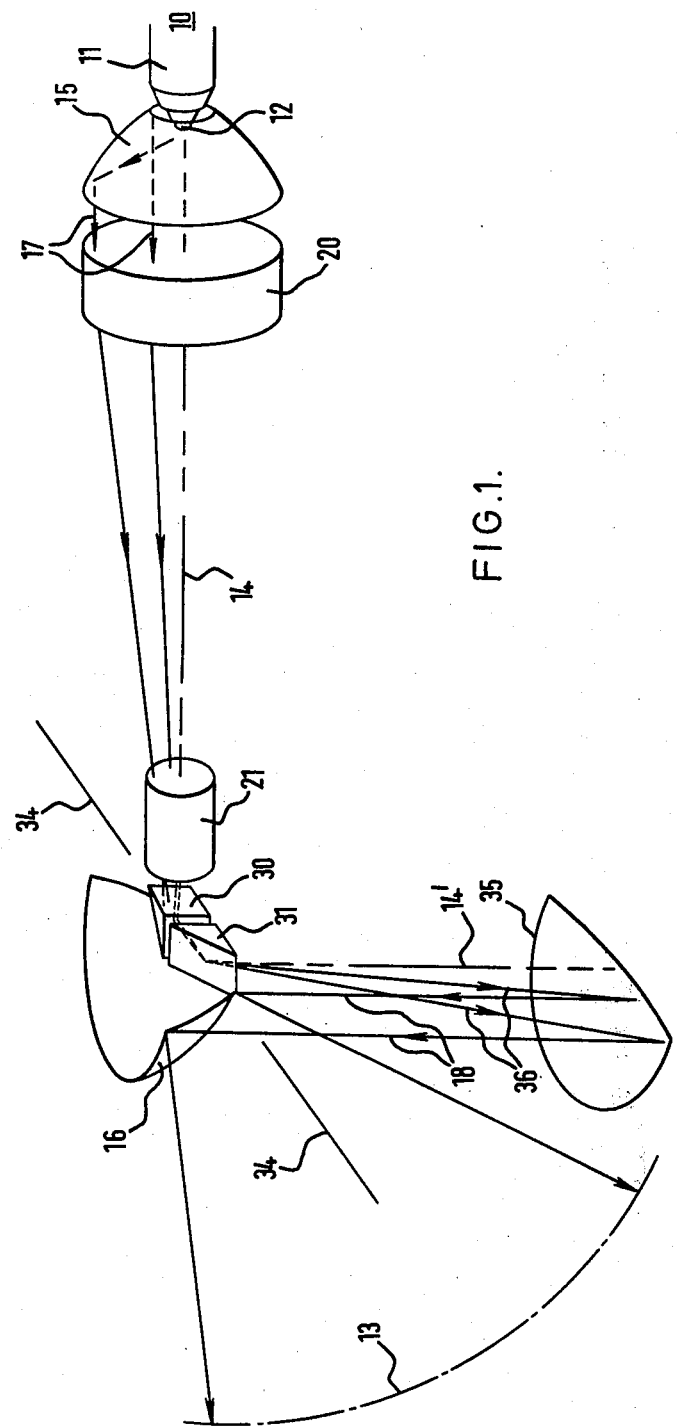
FIG. 1 is a perspective view of the pitch and roll optical system showing the design concepts of both embodiments.

FIG. 1 shows the design concepts for a pitch and roll optical system able to receive and to output a wide-angle display. The system of this embodiment is designed to receive the image at a horizontal terrain scene. The image subtends 180° horizontally by 60° vertically, the vertical field being distributed 15° above to 45° below the terrain horizon plane. The system outputs the light to reform the scene image with the same field angles and with minimal distortion and image blurring, but the system introduces controllable pitch and roll rotations on the output image. The optical axis of the system is identified with the nadir direction of the scene, so that the field angles at which the system is actually used are 45° off axis to 105° off axis, by 180° in azimuth.

FIG. 1 shows the nose 11 of a scanned-laser display projector 10 which has an effective exit pupil location at frame scan prisms 12 from which light is received by the pitch and roll optical system.

At the output end of the pitch and roll optical system, the display image is projected onto a concave hemispherical shell, one section through the reflecting surface of which is represented by the broken line 13.

Figure 4:
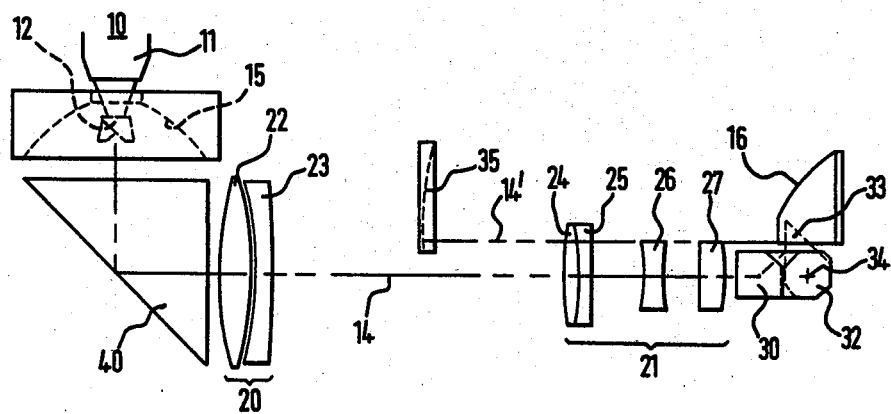
FIG. 4 is a diagram showing the elements of the practical optical system.

The pitch and roll system is folded at prisms in the views of FIG. 1 and FIG. 4. Ignoring these folds, all optical elements of the system are on a common axis of symmetry which is the optical axis of the system. The initial location 14 of the optical axis of the system is also the roll axis and is parallel to the axis of rotation of the frame scanner prisms 12 of the projector 10. This is also the nadir-apogee direction in the field of view generated by the projector 10. When the system is set to simulate level flight, as is shown in FIG. 1, the final direction of the optical axis is vertical, as is shown at 14'.

The first and the last elements of the pitch and roll optical system are both paraboloidal mirrors. The first mirror 15 is concave and the last mirror 16 is convex. It is required for the mirrors 15 and 16 to have complementary reflecting surfaces.

The use of paraboloidal mirrors enables the system to receive and to output a display having a large field angle. The complementary reflecting surfaces of the two mirrors ensures that the large field angle input to the system is mapped to equal angles reflected from the final mirror 16. With these conditions, the heavy distortion and image blurring aberrations produced by the first mirror 15 are exactly corrected at the output mirror 16.

The concave paraboloidal mirror 15 has the exit pupil of the frame scanner 12 at its focus, so that it reflects light from the projector 10 along paths 17 all of which are parallel to the optical axis 14. The convex paraboloidal mirror 16 receives incident light on paths 18, all of which are parallel to the optical axis 14', and reflects the light into a large angular field and onto the reflecting surface of the display screen 13.

The input and output elements 15, 16 of the optical system serve to reduce the exacting optical demands on the intermediate optical elements which can then be configured without need to deal with large field angles. In consequence, aspheric surfaces are not required and the intermediate optics have only spherical and flat surfaces.

The theoretical requirements of the intermediate optic system are that it must provide a region of constricted beam envelope at which the pitch and roll prisms are located. It must image the paraboloid surface of mirror 15 onto that of mirror 16 at unit magnification. It must, for axis-parallel input rays, provide axis-parallel output rays, that is it must be telecentric, and it must itself introduce negligible distortion and image-blurring aberration.

To this end, as shown in FIG. 1, there is provided a collimator system comprising lenses 20 and 21 which, following lens 21, provides the required region of constricted beam envelope around a pupil image at which the pitch and roll prisms are located. These are shown in FIG. 1 as a roll prism 30 and a pitch prism 31.

The exit pupil of this optical system is at the focus of the convex paraboloidal mirror 16. That is, the focus of mirror 16 is the point of origin of the scanned pencil of light rays finally directed onto the screen 13.

It is desirable that the exit pupil should move as little as possible with rotations of the pitch and roll prisms 30, 31. As shown in FIG. 1, the prisms 30, 31 and their axes of rotation 34, 14, respectively, are set close to the convex paraboloidal mirror 16. To achieve this construction, a further mirror 35 is provided. Mirror 35 is a concave spherical mirror having its axis on the optical axis 14' and its purpose is to reflect rays 36, after reflection by the prisms 30, 31, back to the mirror 16 along paths parallel to the axis 14'.

The optical elements rotated in pitch are the pitch prism 31, the spherical mirror 35 and the paraboloidal mirror 16. These three elements are constructed as a rigid sub-assembly able to rotate about the pitch axis 34.

The optical elements necessarily rotated in roll are the pitch sub-assembly 31, 35, 16 together with the oll prism 30. It is convenient also to rotate either or both the lenses 21, 20 and easy to do so since these lenses are co-axial with the roll axis 14.

It will be noted that the pitch axis 34 is colinear with the optical axis in the region of optical axis fold between the two prisms 30, 31, so that both pitch and roll rotations are about axes which are coincident with the input optical axis.

It is known that pitch and roll rotations of this kind generate, in addition to the required pitch and roll rotations, a rotation of the output image on the optical axis which is not required. Since the optical axis is at nadir with respect to the image, this unwanted rotation corresponds to heading rotation. Compensating derotation, according to this first embodiment of the invention, is effected by phase control of the projector frame-scan motions, which produce heading rotation in known manner.

Alternative image derotation means are described with reference to the second embodiment of FIG. 5.

Considering the field and pupil imagery throughout the pitch and roll system, the concave paraboloidal mirror 15, having the projector 10 exit pupil at its focus, projects an image of this pupil to infinity, that is the principal ray of the pencil reflected by mirror 15 is always parallel to the axis 14. Lenses 20, 21 form a real pupil image in the region of the pitch and roll prisms 30, 31. The spherical mirror 35 has its focus, half-radius point, at that intermediate real pupil image, so that it relays the pupil image to infinity, that is it recollimates the principal rays of all pencils reflected at mirror 15. The convex paraboloidal mirror 16 finally forms a virtual image of the pupil at its own focus.

Figure 2:
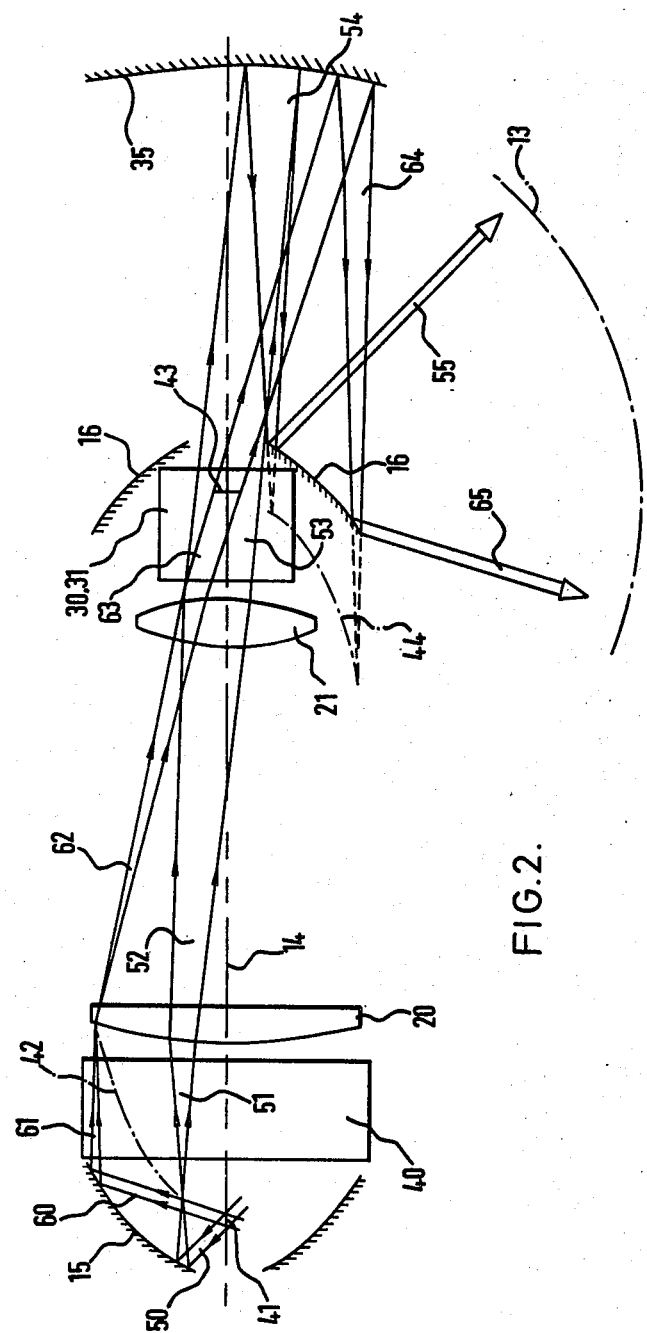
FIG. 2 is a schematic ray diagram.

In the schematic ray diagram of FIG. 2, the optical axis 14, 34, 14' is shown as a straight line, ignoring the folds at the pitch and roll prisms 30, 31 and also at an auxiliary fold prism 40, which is shown in the practical optical system of FIG. 4.

The exit pupil of the projector 10 is shown at 41, positioned at the focus of mirror 15. Two ray pencils 50 and 60 leaving the frame scan prisms 12, are shown in FIG. 2. As is shown by the convergence of reflected ray pencils 51 and 61, the principal rays of both of which are parallel to axis 14, a real image surface is formed at 42. The corresponding ray pencils 52, 53 and pencils 62, 63, respectively, passing through lenses 20, 21, are convergent to axis 14 and form an image of the pupil at plane 43. The corresponding ray pencils 54 and 64, respectively, after reflection at mirror 35, would form an image at surface 44 but, before so doing, are reflected at mirror 16 as pencils 55 and 65, respectively. Thus, surface 44 is a virtual image surface. The pencils 55, 65 correspond to the original pencils 50, 60, respectively, and travel to the screen 13 along paths which are parallel to, but opposite in direction to, the original paths of pencils 50, 60.

The field image at surface 43 is collimated only approximately by the collimator 20, 21 and, due to the very deep curvature of the image, good collimation is provided for an annular region of the field only. It is preferred to set this region to correspond to the horizon line.

The optical elements of FIG. 2 are not shown to scale and in particular the projection screen indicated at 13 is a large hemispherical screen of a few metres in diameter and is positioned at the distance of its radius from the exit pupil of the optical system.

Figure 3:
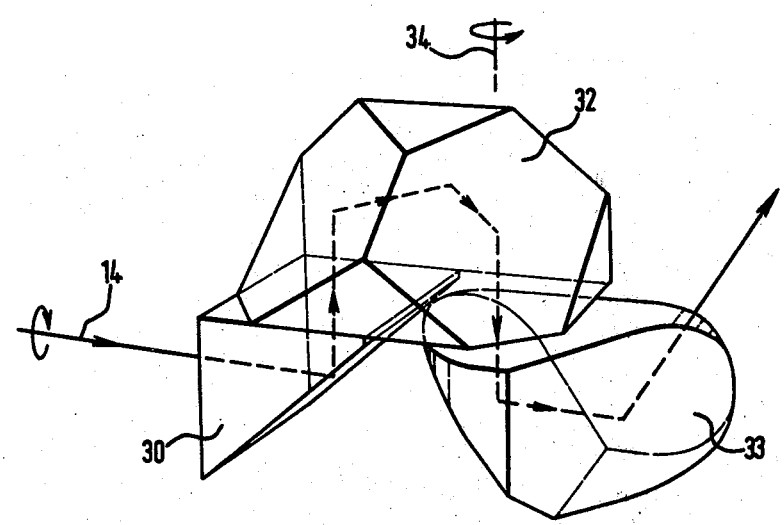
FIG. 3 is a perspective view of the pitch and roll prism assembly preferred in a practical optical system.

FIG. 3 shows the pitch and roll prism combination used in a preferred practical embodiment. The prism combination comprises an input roll prism 30 and a triple-reflecting prism 32 together forming a roll prism assembly which is rotatable about the roll axis, which is colinear with the initial optical axis location 14 of the system.

The final prism of the combination is a double-reflecting pitch prism 33 which is rotatable about the pitch axis 34. This pitch axis is colinear with the optical axis in the region between the last reflecting surface of prism 32 and the first reflecting surface of prism 33.

FIG. 3 shows the relative positions of the pitch and roll prisms for all roll orientations and for the attitude at or near 0° pitch.

FIG. 4 is a diagram of the preferred practical pitch and roll optical system. It will be noted that an extra fold prism 40 is provided between the input concave paraboloidal mirror 15 and the first element of the field lens 20 of the collimator. Fold prism 40 sets the optical axis of the collimator 20, 21 at right angles to the axis of the projector nose 11.

The field lens 20 group comprises a doublet of converging lens 22 and diverging lens 23. The collimator lens 21 group comprises a further doublet 24, 25 and spaced apart lenses 26 and 27.

The prism combination of FIG. 3 follows with the roll axis of prisms 30, 32 colinear with the optical axis 14 at the collimator. Pitch prism 33 directs the optical axis 14' to the concave spherical mirror 35, parallel to the optical axis part 14 for the attitude of FIG. 3 which is 0° roll, 90° pitch. The mirror 35 directs beams leaving prism 33 back onto the output convex paraboloidal mirror 16 and thence onto the projector screen surface 13, not shown in FIG. 4 which is approximately to scale.

The image 42 of the field formed between the paraboloids 15 and 16 is annular, with the bottom of the field at (−) 45° declination to the pilot and the top of the field at +15° elevation. The field angles with respect to the pitch and roll system are from ±45° off axis to ±105° off axis. The dead zone ±45° off axis is associated with holes at the centres of the two paraboloidal mirrors 15 and 16 which are occupied respectively by the projector nose 11, 12 and by the pitch prism 33.

Practical focal lengths are as follows: for the paraboloidal mirrors, 15 mm and −15 mm respectively, for the collimator, 200 mm and, for the spherical mirror, also 200 mm. With these focal lengths, good correction for distortion and other optical aberrations is achieved across the whole field for an incident pencil beam diameter of 1 mm. The exit pupil is on the roll axis 14 at zero pitch and is at a constant 15 mm from the pitch axis 34.

The display projection screen 13 is a hemispherical shell of a few metres diameter, in this embodiment, having its inner surface covered with a material which provides a ×4 light gain in the dirction of viewing of any point of the display. The hemispherical shell is positioned so that its centre line is 9 inches below the centre of the exit pupil of the optical system.

The display is viewed from 9 inches below the screen centre line. In visual display apparatus using the invention, trainee pilot seating is provided to give an eye position 9 inches below the screen centre line.

Figure 5:
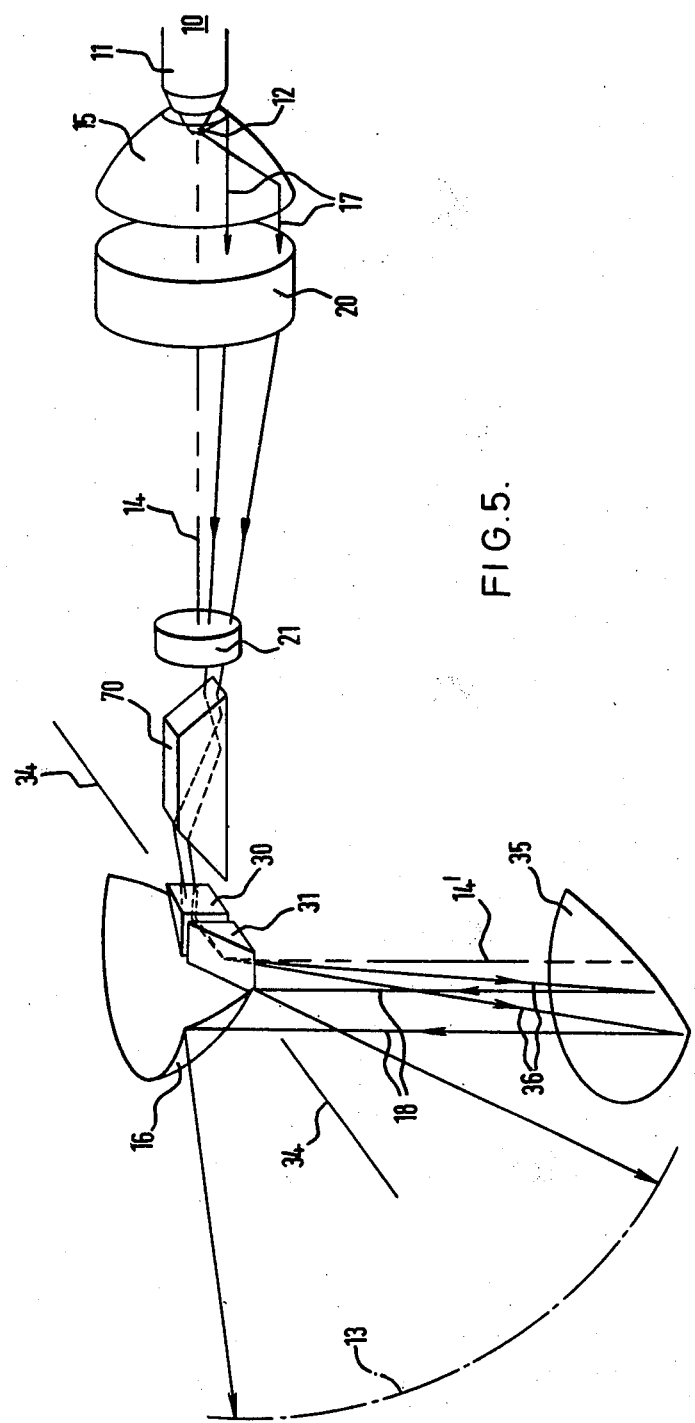
FIG. 5 is a perspective view corresponding to that of FIG. 1 and showing image derotation means specific to the second embodiment.

FIG. 5, which is to be compared with FIG. 1 and wherein most of the elements are identical with those of FIG. 1, shows a second embodiment of the invention differing only in the means of image derotation. Whereas the embodiment of FIG. 1 uses phase control of the projector frame scan motions for image derotation, the embodiment of FIG. 5 uses a derotation dove prism 70 which is positioned between the collimator lens element 21 and the pitch and roll prism combination 30, 31. The same dove prism 70 also provides required heading rotations.

I claim:

1. Optical apparatus for receiving radiation from at wide-angle input field, and transmitting the radiation into a wide-angle output field, said transmission being such that the output field is an image of the input field formed substantially at unit magnification, and for providing rotation at the output field with respect to the input field, said optical apparatus comprising a concave axially-symmetric aspheric mirror and a convex axially-symmetric aspheric mirror having complementary reflecting surface shapes, approximately paraboloids, at the foci of which the entrance and exit pupils of the system are located, and an optical system in the radiation path between the two mirrors comprising reflecting prisms and two imaging systems of equal focal length and complementary distortion located such that their inner focal surfaces coincide at an intermediate pupil image and their outer focal surfaces are respectively near the two aspheric mirrors such that the surfaces of the two aspheric mirrors are imaged one onto the other at substantially unit magnification and without distortion, the optical axes of the two aspheric mirrors and of all elements of the two imaging systems being imaged onto a common line by reflection in the reflecting prisms, the reflecting prisms being rotatable provide deflection of reflected radiation and of the optical axes of elements in the path of reflected radiation, so that radiation received from an input field at a first of the two aspheric mirrors is transmitted to the second of the two aspheric mirrors and reflected from it into an output field formed substantially at unit magnification and so that the output field is rotatable with respect to the input field.

2. Optical apparatus as claimed in claim 1, in which the rotatable reflecting prisms are positioned in the region of the said intermediate pupil image.

3. Optical apparatus as claimed in claim 2, in which one of the said two imaging systems is positioned between the convex aspheric mirror and the rotatable reflecting prisms and comprises a second concave mirror.

4. Optical apparatus as claimed in claim 3, in which two of the said rotatable reflecting prisms each deflect radiation through 90° and rotate on axes which are coincident with their respective incident radiation directions and in which all following elements of the apparatus are rotated with the reflected radiation on the same axes.

5. Optical apparatus as claimed in claim 4, comprising a third rotatable prism, operative as an image rotating prism for rotating the transmitted radiation on the local optical axis.

* * * * *